United States Patent
Sellappan et al.

(10) Patent No.: US 11,667,580 B2
(45) Date of Patent: Jun. 6, 2023

(54) METHOD FOR PRODUCING A SURFACE LAYER ON A CERAMIC MATRIX COMPOSITE

(71) Applicant: Rolls-Royce High Temperature Composites Inc., Cypress, CA (US)

(72) Inventors: Pathikumar Sellappan, Seal Beach, CA (US); Sungbo Shim, Irvine, CA (US); Kevin Mark Lukhard, Anaheim, CA (US)

(73) Assignee: ROLLS-ROYCE HIGH TEMPERATURE COMPOSITES INC., Cypress, CA (US)

( * ) Notice: Subject to any disclaimer, the term of this patent is extended or adjusted under 35 U.S.C. 154(b) by 396 days.

(21) Appl. No.: 17/012,977

(22) Filed: Sep. 4, 2020

(65) Prior Publication Data

US 2021/0070664 A1 Mar. 11, 2021

Related U.S. Application Data

(60) Provisional application No. 62/896,840, filed on Sep. 6, 2019.

(51) Int. Cl.
*C04B 35/80* (2006.01)
*F01D 25/08* (2006.01)
(Continued)

(52) U.S. Cl.
CPC ............ *C04B 35/80* (2013.01); *B28B 11/041* (2013.01); *C04B 35/62863* (2013.01); *C04B 35/62873* (2013.01); *C04B 35/657* (2013.01); *C04B 41/009* (2013.01); *C04B 41/5059* (2013.01); *C04B 41/87* (2013.01); *F01D 25/08* (2013.01); *C04B 2235/3826* (2013.01); *C04B 2235/48* (2013.01); *C04B 2235/5252* (2013.01); *C04B 2235/616* (2013.01); *F05D 2220/32* (2013.01); *F05D 2230/20* (2013.01); *F05D 2230/90* (2013.01)

(58) Field of Classification Search
None
See application file for complete search history.

(56) References Cited

U.S. PATENT DOCUMENTS 6,139,942 A 10/2000 Hartness et al.
7,686,990 B2 3/2010 Gray
(Continued)

FOREIGN PATENT DOCUMENTS

WO WO 97/07254 2/1997
WO WO 03/051948 A1 6/2003

*Primary Examiner* — Jeffrey D Washville
(74) *Attorney, Agent, or Firm* — Crowell & Moring LLP

(57) ABSTRACT

A method is provided in which a resin coating is applied to a surface of a preform. The resin coating includes a carbonaceous resin and a particulate. The preform is added to a tooling. The preform, which is positioned in the tooling, is cured. The tooling is removed. The resin coating on the surface of the preform is pyrolyzed to form a resin carbon-char layer on the surface of the preform. The preform and the resin carbon-char layer are infiltrated with silicon to form a ceramic matrix composite (CMC) component including a layer of silicon carbide. During the infiltration, the silicon reacts with carbon in the resin carbon-char layer to form the layer of silicon carbide on the preform.

20 Claims, 3 Drawing Sheets

(51) Int. Cl.
   *C04B 35/628*   (2006.01)
   *C04B 35/657*   (2006.01)
   *C04B 41/00*    (2006.01)
   *C04B 41/50*    (2006.01)
   *C04B 41/87*    (2006.01)
   *B28B 11/04*    (2006.01)

(56) References Cited

U.S. PATENT DOCUMENTS

| | | |
|---|---|---|
| 9,238,595 B2 | 1/2016 | Bouillon et al. |
| 2014/0109756 A1* | 4/2014 | Aghjanian ............... C04B 41/85 89/36.02 |

* cited by examiner

METHOD FOR PRODUCING A SURFACE LAYER ON A CERAMIC MATRIX COMPOSITE

CROSS-REFERENCE TO RELATED APPLICATION

This application claims the benefit of U.S. Provisional Application No. 62/896,840, filed Sep. 6, 2019. The contents of U.S. Provisional Application No. 62/896,840 are hereby incorporated by reference in their entirety.

TECHNICAL FIELD

The present disclosure is directed generally to the fabrication of ceramic matrix composites and more particularly infiltration of a porous preform.

BACKGROUND

Ceramic matrix composites (CMCs), which include ceramic fibers embedded in a ceramic matrix, exhibit a combination of properties that make them promising candidates for industrial applications that demand excellent thermal and mechanical properties along with low weight, such as gas turbine engine components. Accordingly, there is a need for inventive systems and methods including CMC materials described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1A:
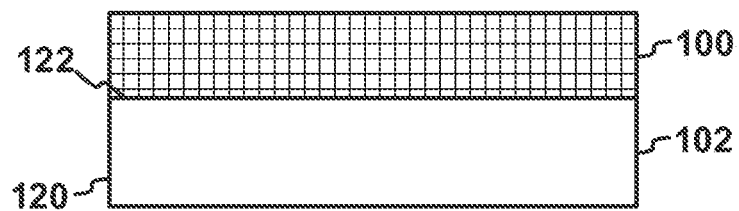
FIG. 1A illustrates an impregnated porous preform, which includes a resin coating.

In one example, a method is provided in which a resin coating is applied to a surface of a preform. Because of the relatively high viscosity of the resin coasting, infiltration of the resin coating into the preform is highly limited. The resin coating includes a carbonaceous resin and a particulate. The preform is added to a tooling. The preform, which is positioned in the tooling, is cured. The tooling is removed. The resin coating on the surface of the preform is pyrolyzed to form a resin carbon-char layer on the surface of the preform. The preform and the resin carbon-char layer are infiltrated with silicon or silicon alloy to form a ceramic matrix composite (CMC) component including a layer of silicon carbide. For example, the infiltration may include melt infiltration, wherein molten silicon passes though the resin carbon-char layer and/or is wicked into the preform from a side of the preform that is not covered by the resin carbon-char layer. During the infiltration, the silicon reacts with carbon in the resin carbon-char layer to form the layer of silicon carbide on the preform.

In another example, a method for forming a silicon carbide-rich outer layer on a CMC component is provided in which a resin coating is applied to a surface of a preform. The resin coating includes a carbonaceous resin and a particulate. The preform is added to a tooling after the application of the resin coating to the preform. The tooling is in a shape of at least a portion of a component of a gas turbine engine. The preform is cured. The tooling is removed. The resin coating on the surface of the preform is pyrolyzed to yield a resin carbon-char layer on the surface of the preform. After the resin coating is pyrolyzed, the preform is immersed in a molten material. The molten material infiltrates the preform.

In yet another example, a CMC component is provided, which includes a CMC body. The CMC component further includes an outer layer surrounding the CMC body. The outer layer defines a periphery and/or surrounds the CMC component. The outer layer includes at least 90% silicon carbide by volume.

Ceramic matrix composites (CMCs) may include outer surfaces having a wavy and/or rough texture, which may make the CMC less desirable for various high temperature applications. Furthermore, in traditional CMC, exposed fibers may interact with plasma spray process during the application of an environmental barrier coating (EBC), which might damage the interface coatings and weaken the mechanical behavior of the fibers. The SiC rich layer on the surface of the CMC may also help to limit and/or prevent the diffusion of impurities from the CMC towards the EBC's, which may accelerate a growth rate and a phase transformation of thermally grown oxides (TGO's) at an interface between a top coat of the EBC and a bond coat of the EBC. In addition, the wavy and/or rough texture on the surface may result in unwanted turbulence in fluid flow over the surface of the CMC components. One interesting feature of the methods described below may be that a layer of silicon carbide (SiC) is produced on a surface of a ceramic matrix composite (CMC). The layer of SiC may have a smoother outer surface than CMCs developed through other methods. The layer of SiC may further have a controlled thickness. The smooth surface and controlled thickness of the layer may reduce overall processing time and improve manufacturability. This is because the smooth surface may not require machining in order to complete the CMC component or at least limit the amount of machining required. The smooth surface may further improve dimensional tolerance, also known as tolerance stack, and aerodynamic performance of the CMC component. Additionally, the high content of SiC in the layer may act as a barrier for high temperature diffusion. The layer of SiC may have a smooth outer surface and be a predetermined thickness, such that the layer may act as a sacrificial layer during surface preparation for EBC.

FIGS. 1A-E schematically illustrate a method for fabricating ceramic matrix composites with a silicon carbide (SiC) rich outer layer. As used herein, the term "silicon carbide" may refer broadly to the compound SiC as well as to other silicon-containing carbides.

FIG. 1A illustrates an impregnated porous preform which includes a resin coating 100. The method includes applying a resin coating 100 comprising a resin and particulate solids onto one or more outer surfaces 120 of an impregnated porous preform 102. In an example, the resin coating 100 is spread onto an outer surface 122 of the impregnated porous preform 102. In other examples, the outer surface 122 of the impregnated porous preform 102 may be dipped, painted, and/or spin coated with the resin coating 100.

The impregnated porous preform 102, hereinafter referred to as the preform 102, may be any structure that includes a framework of ceramic fibers and that is loaded with particulate matter as a result of prior slurry infiltration. In some examples, the impregnated porous preform may include a two- or three-dimensional weave of the ceramic fibers. In other examples, the preform 102 may include a unidirectional tape. The impregnated porous preform 102 may be formed by a slurry infiltration process that is carried out before the resin coating 100 is applied.

The ceramic fibers that serve as the framework for the preform 102 may include SiC, or any other ceramic, such as silicon nitride, alumina, aluminosilicate, or carbon. The particulate matter contained in the preform 102 includes ceramic particles that become part of the ceramic matrix after melt infiltration. The ceramic particles may include SiC. Alternatively or in addition, the ceramic particles may include silicon nitride, alumina, aluminosilicate, boron carbide, and/or any another refractory carbide. In one example, the ceramic fibers comprise silicon carbide, and the ceramic particles (and ultimately the ceramic matrix) also comprise SiC. The ceramic matrix composite that is formed in such an example may be referred to as a silicon carbide/silicon carbide or SiC/SiC composite. The particulate solids used to form the resin coating on the surface of the preform 102 may include the same or different ceramic particles as contained in the preform 102. The ceramic particles of the resin coating 100 may also include silicon carbide.

The porous preform 102 may be formed by a slurry infiltration process prior to the application of the resin coating 100. Slurry infiltration may entail infiltrating a slurry composition comprising a solvent and the particulate matter into a porous preform comprising the framework of fibers, followed by drying in order to remove the solvent. Alternatively or in addition, reactive elements (for example, carbon) may be incorporated into the preform 102 after slurry infiltration (but typically before application of the resin coating 100 on the surface) by infiltration with a resin or char-yielding polymer. Slurry infiltration may further be preceded by a chemical vapor infiltration process and by construction of the porous preform using fabrication traditional methods.

The resin coating 100 may be any composition applicable to a surface of the preform 102 and configured to remain on the surface of the preform 102 without infiltrating therein or at least only partially infiltrating therein. The resin may be any solid or highly viscous substance of plant or synthetic origin that may be converted into polymers. For example, the resin may include a furfuryl alcohol resin, a phenol formaldehyde resin, or any other resin suitable for the fabrication of CMCs. Additionally the resin may be considered a carbonaceous resin, because the resin contains carbon and/or carbon compounds. The particulate solids may be any solid matter suspended in the resin. In an example, the particulate solids may be SiC. The resin coating 100 may have a predetermined viscosity, which is in a suitable range for applying the resin coating 100 on the surface of the preform 102 and also for limiting infiltration of the resin coating 100 into the preform 102. In an example, the predetermined viscosity of the resin coating 100 may be in a range of 600-1200 cP. The predetermined viscosity may be sufficiently high, such that the resin coating is prevented and/or limited from infiltrating the preform 102. By preventing and/or limiting the resin coating 100 from infiltrating the preform 102, the formation of heterogeneous microstructures between resin and the matrix material may also be prevented and/or limited. The resin coating 100 may include other components as needed, for example, to control viscosity, in addition to the resin and/or the particulate solids. The resin may be a high char-yielding resin, such as a phenolic resin, where char yield may be understood to refer to the percent solids (primarily and/or exclusively carbon) remaining after pyrolysis, as discussed below. In some examples, a resin may be considered a high char yielding if a percentage range for solids remaining after pyrolysis is between 50-55%. In other examples, the percentage range for solids remaining may be greater than 55%.

Figure 1B:
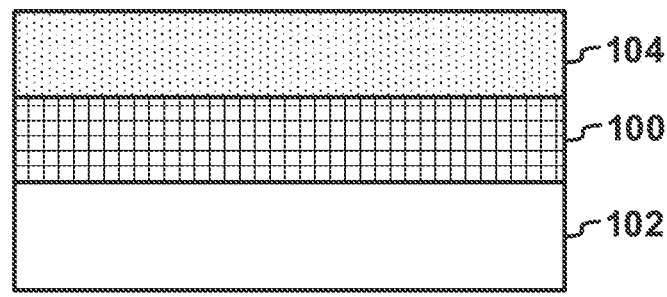
FIG. 1B illustrates an example of the impregnated porous preform, which has been added to a tooling.

FIG. 1B schematically illustrates an example of the preform 102 which has been added to a tooling 104. After the application of the resin coating 100 to the preform 102, the tooling 104 is positioned with the preform 102. The tooling may be any structure configured to hold the preform 102 to a predetermined shape. The predetermined shape may be in the shape of a complete component for a gas turbine engine, such as a blade, a vane, and/or a casing. In other examples, the tooling 104 may be in the shape of only a part of the complete component for the gas turbine engine. Examples of the tooling 104 may include a mold and/or casting.

The tooling 104 may be in a shape and/or size that is substantially similar to the preform 102, such that a space between the tooling 104 and the preform 102 is controlled to a predetermined spacing. The predetermined spacing may determine a thickness of the resin coating 100 that fills the space between the tooling 104 and the preform 102. In other words, if the shape and size of the tooling 104 is substantially similar to the shape and size of the preform 102, the resin coating 100 will be relatively thin. If a thicker resin coating 100 is desired, a tooling 104 may be used that is larger and/or of a different shape than the preform 102. Furthermore, the tooling 104 may be tailored for a specific part and/or component, such that the resin coating 100 may have a different thickness at different points on the preform 102. Alternatively, the resin coating 100 may have a uniform thickness. Alternatively or in addition, the tooling 104 may further include projections extending from the inner surface of the tooling 104 and into the resin coating 100. The projections may define channels in the cured preform 102. The channels may be configured to receive and direct molten material into the preform 102 during melt infiltration as discussed further herein.

In another example, the tooling 104 is added to the preform 102 before the application of the resin coating 100. In this example, the resin coating 100 may be injected or otherwise introduced to fill a space between the tooling 104 and the preform 102.

After the application of the resin coating 100 and the positioning of the preform 102 in the tooling 104, the preform may be cured to immobilize and/or harden the resin coating 100, thereby forming a surface coating 106, or cured resin coating, on the preform 102. The curing may include heating the resin coating 100 to an elevated temperature that is in a range from 150° C. to 400° C. Alternatively or in addition, the curing may include exposing the preform 102 to light or a chemical curing agent. The curing may take place over a time period of about 1 min to about 60 min. The tooling 104 may have a smooth inner surface free from indentations and/or projections, such the surface of the surface coating 106 after curing is also smooth. For example, the surface coating may have an average roughness in a range of 50-200 micro-inches Ra.

The smoothness of the surface of the surface coating 106 may reduce and/or eliminated a need for machining, which may be a bottleneck in the fabrication in the CMC process. Furthermore, by using a tooling 104 that is the approximate shape of the CMC component, the need for machining may be further reduced and/or eliminated.

Figure 1C:
FIG. 1C illustrates an example of the preform, which has been cured.

FIG. 1C schematically illustrates an example of the preform 102, in which the tooling 104 has been removed after the curing. After curing, the surface coating 106 may be pyrolyzed to convert the resin in the surface coating 106 to carbon. The pyrolysis may be carried out at a temperature in a range from about 800° C. to about 1300° C. in an ambient (e.g., air) or controlled environment (e.g., vacuum or inert gas). Pyrolysis of the surface coating 106, may form a resin carbon-char layer 108 on the preform 102.

Figure 1D:
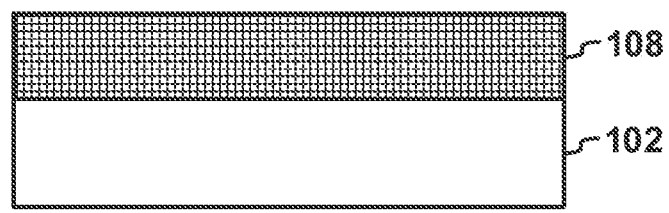
FIG. 1D illustrates an example of the preform, which includes a resin carbon-char layer.

FIG. 1D schematically illustrates an example of the preform 102 in which the preform 102 and/or the surface coating 106 has been pyrolyzed to form the resin carbon-char layer 108. The resin carbon-char layer 108 may be any carbon-rich species having a certain char yield. For example, the char yield may be in a range of 50-60%. The resin carbon-char may include only carbon. Alternatively or in addition, the resin carbon-char layer 108 may include SiC. The resin carbon-char layer 108 may form an outer layer of the preform 102. In one example the resin carbon-char layer is a peripheral layer of the entire preform 102. In another example, the resin carbon-char layer 108 covers only a portion of the preform 102. The presence of carbon-rich char at the outer surface of the preform 102 may prevent and/or limit silicon forming at the surface of the final CMC, for example, during melt infiltration.

Prior to melt infiltration, the particulate matter that makes up the resin coating 100 and the particulate solids contained in the preform 102 may include, in addition to the ceramic particles, one or more reactive elements. Exemplary reactive elements include carbon (e.g., graphite, carbon black, diamond) and/or refractory metals such as molybdenum, tungsten, and/or titanium. The reactive element(s) are present to react with the molten material during melt infiltration and form a desired reaction product. For example, the reactive element may be a ceramic precursor that can react with a molten metal or alloy (e.g., silicon metal or a silicon alloy) to form a ceramic (e.g., silicon carbide). Other reactive elements may react with a molten metal to form an alloy in the molten state which may then react with a ceramic precursor to form a ceramic. The reactive elements contained in the preform 102 can react with the molten metal (or alloy) during melt infiltration and produce a ceramic reaction product that may ultimately form, along with the ceramic particles, the ceramic matrix of the fiber composite. Some of the molten material may remain unreacted during melt infiltration.

After the preform 102 is pyrolyzed, the preform 102 may be infiltrated. In an example, the preform 102 is infiltrated by melt infiltration. Melt infiltration is a method of infiltration in which a preform is introduced to a molten material, such as silicon, such that the molten material enters at least a portion of the preform 102. Examples of the molten material may include silicon and/or a silicon alloy including, for example, boron, tungsten, titanium, and/or tantalum. In one example, the molten silicon passes through the resin carbon-char layer 108 and into the preform 102. Alternatively or in addition, the preform 102 and/or the resin carbon-char layer 108 may serve as a wick to transport the molten silicon into the preform 102. Furthermore, in an example, the molten silicon may be introduced to a side of the preform 102 that is not covered by the resin carbon-char layer 108.

During melt infiltration, as the molten material flows over the outer surfaces(s) and infiltrates the preform 102, the molten material may react with the carbon and/or SiC present in the resin carbon-char layer 108 and/or in the preform. In some examples, from about 5 vol. % to about 15 vol. % of the CMC may be unreacted silicon. It may be beneficial to reduce the amount of unreacted metal, such as silicon, in the final CMC. This may be especially true at a surface of the final CMC. To achieve this, in one example, the molten silicon may react with the abundance of carbon in the resin carbon-char layer 108 to from Si—C bonds.

Figure 1E:
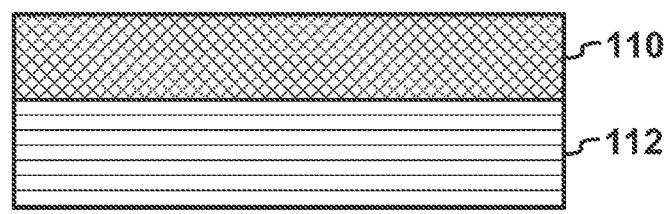
FIG. 1E illustrates a CMC component including a SiC-rich layer.

FIG. 1E schematically illustrates a CMC component 112 and a SiC-rich layer resulting from the infiltration of the resin carbon-char layer 108 and the preform 102. The method of melt infiltration described herein may result in a final SiC-rich layer 110 at the surface of a CMC component/part 112, as the molten silicon reacts with carbon in the resin carbon-char layer 108. Furthermore, upon melt infiltration with silicon or a silicon alloy, the carbon is converted to silicon carbide, and the silicon carbide already at the surface of the preform 102 may help to prevent and/or limit any unreacted silicon from accessing the surface of the CMC component. In some examples, at least 90 vol. % of the SiC-rich layer 110 may be SiC and/or SiB. Furthermore, less than 10% of the SiC-rich layer 110 may be unreacted (free) silicon. The SiC-rich layer may have less than 2% residual porosity. The formation of SiC from the reaction of molten silicon with carbon during melt infiltration may be associated with a volume expansion of the resin carbon-char layer 108 of about 2 to 3 times, which may help reduce porosity of the SiC-rich layer 110 and roughness of the outer surface of the SiC-rich layer 110. The SiC-rich layer 110 may have a thickness between 50-250 microns.

After infiltration, the molten material may be cooled, and a ceramic matrix composite comprising the ceramic fibers embedded in a ceramic matrix is formed. During cooling, an optional flowing of nitrogen or ammonia may be performed to prevent and/or limit nodule formation on the CMC 112 component and/or SiC-rich layer 110. The ceramic matrix is formed from the particulate matter in the preform as well as any ceramic reaction products created from the reaction between the molten material and the reactive element(s) in the preform 102. The ceramic matrix may also include a residual amount of unreacted metal or alloy, typically silicon or a silicon alloy. The SiC-rich layer 110 may remain on the CMC or may be removed in whole or in part (e.g., by machining).

In some examples, the CMC component 112 may refer to the combination of the CMC component 112 and the SiC-rich layer 110. In other examples the CMC component may be any CMC body including a matrix reinforced with silicon carbide fibers, carbon fibers, alumina fibers, aluminosilicate fibers, and/or other ceramic fibers. The matrix (and thus the matrix material referred to above) may comprise silicon carbide, silicon nitride, silicon nitrocarbide, and/or other ceramic compounds. Typically, the fibers are silicon carbide fibers and the fiber preform is a silicon carbide fiber preform. A ceramic matrix composite that includes a matrix comprising silicon carbide and fibers comprising silicon carbide may be referred to as a silicon carbide/silicon carbide composite or SiC/SiC composite.

Figure 2:
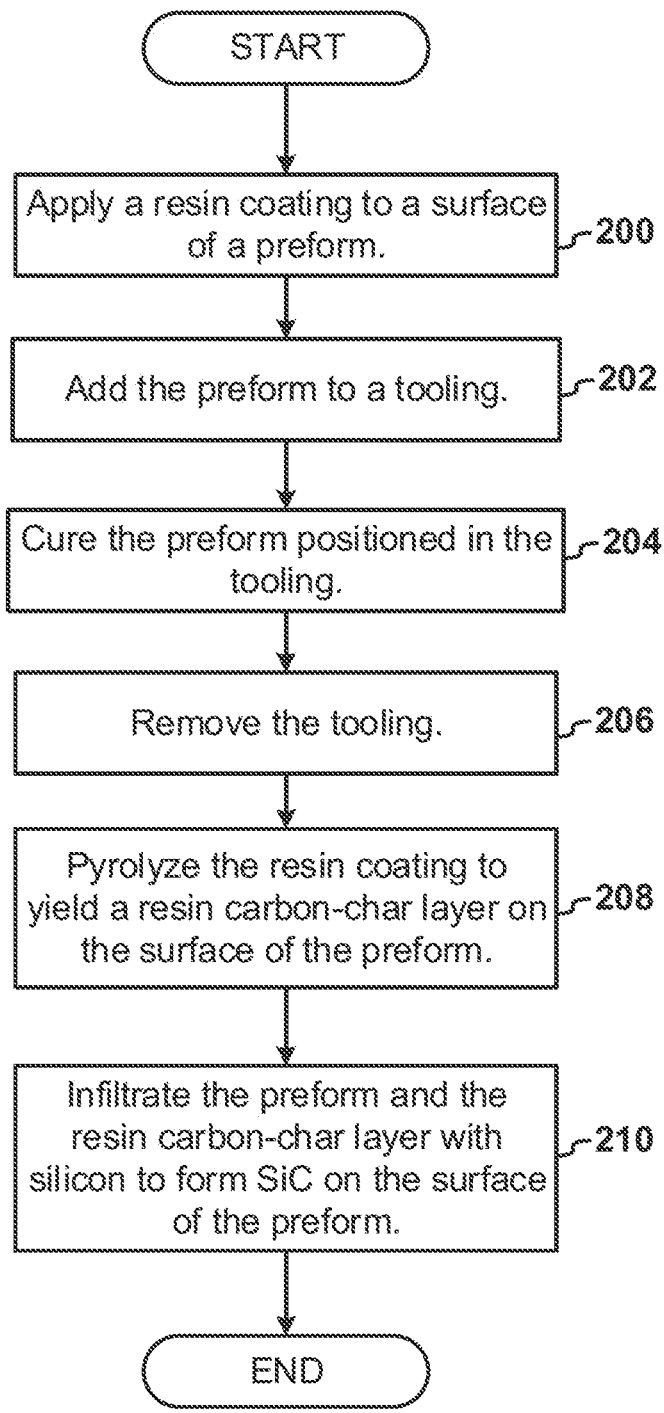
FIG. 2 illustrates a flow diagram of an example of a method of producing the CMC component, which includes the SiC-rich layer.

FIG. 2 illustrates a flow diagram of an example of steps to fabricate the CMC component 112. The resin coating 100 is applied to the surface of the preform 102 (200). The resin coating comprises a carbonaceous resin. The preform 102 is added to the tooling 104 (202). The preform is cured while positioned in the tooling 104 (204). The tooling 104 is removed (206). The resin coating 100 on the surface of the preform 102 is pyrolyzed to yield a resin carbon-char layer on the surface of the preform (208). The preform 102 is infiltrated with silicon (210). The silicon reacts with carbon on the resin carbon-char layer to form a layer of silicon carbide on the preform 102. The steps may include additional, different, or fewer operations than illustrated in FIG. 8. The steps may be executed in a different order than illustrated in FIG. 8. For example, application of the resin coating 100 (200) may be performed after the preform 102 is positioned in the tooling 104 (202), for example, by injection of the resin coating 100 into the tooling 104. In another example, the preform may be pyrolyzed (208) and infiltrated (210) simultaneously. In other examples, the preform may be pyrolyzed (208) before infiltration (210).

The method of fabrication of the CMC component may include other steps, such as laying up of plies to form a fiber preform having a predetermined shape, and/or application of a fiber interphase coating such as boron nitride to the fiber preform prior to rigidization. A rigidized fiber preform may be formed by applying a matrix material to the fiber preform during a chemical vapor infiltration (CVI) process. The rigidized fiber preform may be infiltrated with a slurry comprising silicon carbide particles in a liquid carrier into the SiC fiber preform. The slurry may further include reactive elements such as carbon that can react with the molten silicon or silicon alloy during melt infiltration, thereby reducing free silicon in the bulk of the CMC component.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method comprising: applying a resin coating comprising a carbonaceous resin and a particulate to a surface of a preform; adding the preform to a tooling; curing the preform positioned in the tooling; removing the tooling; pyrolyzing the resin coating on the surface of the preform to yield a resin carbon-char layer on the surface of the preform; and infiltrating the preform and the resin carbon-char layer with silicon to form a ceramic matrix composite (CMC) component including a layer of silicon carbide, wherein during the infiltration the silicon reacts with carbon in the resin carbon-char layer to form the layer of silicon carbide on the preform.

A second aspect relates to the method of aspect 1, further comprising controlling a viscosity of the carbonaceous resin, such that the resin does not infiltrate the preform.

A third aspect relates to the method of any preceding aspect, wherein the viscosity is in a range of 600-1200 cP, inclusively.

A fourth aspect relates to the method of any preceding aspect, wherein the particulate comprises silicon carbide.

A fifth aspect relates to the method of any preceding aspect, wherein the pyrolyzing and the infiltrating are carried out simultaneously.

A sixth aspect relates to the method of any preceding aspect, wherein the layer of silicon carbide has a thickness between 50-250 microns.

A seventh aspect relates to the method of any preceding aspect, wherein the carbonaceous resin includes furfuryl alcohol.

An eighth aspect relates to the method of any preceding aspect, wherein the carbonaceous resin includes phenol formaldehyde.

A ninth aspect relates to the method of any preceding aspect, wherein the infiltrating the preform and the resin carbon-char layer includes melt infiltration.

A tenth aspect relates to the method of any preceding aspect, further comprising cooling the CMC component and the layer of silicon carbide after melt infiltration by introducing nitrogen or ammonia.

An eleventh aspect relates to the method of any preceding aspect, wherein the layer of silicon carbide includes an outer layer of the CMC component comprising at least 90% silicon carbide and/or silicon boride by volume.

A twelfth aspect relates to the method of any preceding aspect, wherein the layer of silicon carbide comprises less than 10% unreacted silicon by volume.

A thirteenth aspect relates to the method of any preceding aspect, wherein the CMC component is at least a portion of a component for a gas turbine engine.

A fourteenth aspect relates to the method of any preceding aspect, wherein the applying the resin coating further comprises injecting the resin coating into the tooling after the preform is added to the tooling.

A fifteenth aspect relates to a method for forming a silicon carbide-rich outer layer on a CMC component, the method comprising: applying a resin coating comprising a carbonaceous resin and a particulate to a surface of a preform; adding the preform to a tooling after applying the resin coating to the preform, wherein in the tooling is in a shape of at least a portion of a component of a gas turbine engine; curing the preform; removing the tooling; pyrolyzing the resin coating on the surface of the preform to yield a resin carbon-char layer on the surface of the preform; and after the pyrolyzing, immersing the preform into a molten material, the molten material being infiltrated into the preform.

A sixteenth aspect relates to the method of any preceding aspect, wherein the molten material includes silicon.

A seventeenth aspect relates to the method of any preceding aspect, wherein the molten material reacts with carbon in the resin carbon-char layer to form an outer layer including silicon carbide.

An eighteenth aspect relates to the method of any preceding aspect, wherein the outer layer includes less than 10% silicon by volume.

A nineteenth aspect relates to a CMC component comprising: a CMC body; and an outer layer surrounding the CMC body and defining a periphery of the CMC component, wherein the outer layer, wherein the outer layer includes at least 90% silicon carbide by volume.

A twentieth aspect relates to the method of any preceding aspect, wherein the outer layer has less than 2% residual porosity.

In addition to the features mentioned in each of the independent aspects enumerated above, some examples may show, alone or in combination, the optional features mentioned in the dependent aspects and/or as disclosed in the description above and shown in the figures.

What is claimed is:

1. A method comprising:
applying a resin coating comprising a carbonaceous resin and a particulate to a surface of a preform;
controlling a viscosity of the carbonaceous resin, such that the resin coating does not infiltrate the preform;
adding the preform to a tooling;
curing the preform positioned in the tooling;
removing the tooling;
pyrolyzing the resin coating on the surface of the preform to yield a resin carbon-char layer on the surface of the preform; and
infiltrating the preform and the resin carbon-char layer with silicon to form a ceramic matrix composite (CMC) component including a layer of silicon carbide, wherein during the infiltration the silicon reacts with carbon in the resin carbon-char layer to form the layer of silicon carbide on the preform.

2. The method of claim 1, wherein the viscosity is in a range of 600-1200 cP, inclusively.

3. The method of claim 1, wherein the particulate comprises silicon carbide.

4. The method of claim 1, wherein the pyrolyzing and the infiltrating are carried out simultaneously.

5. The method of claim 1, wherein the layer of silicon carbide has a thickness between 50-250 microns.

6. The method of claim 1, wherein the carbonaceous resin includes furfuryl alcohol.

7. The method of claim 1, wherein the carbonaceous resin includes phenol formaldehyde.

8. The method of claim 1, wherein the infiltrating the preform and the resin carbon-char layer includes melt infiltration.

9. The method of claim 8, further comprising cooling the CMC component and the layer of silicon carbide after melt infiltration by introducing nitrogen or ammonia.

10. The method of claim 1, wherein the layer of silicon carbide includes an outer layer of the CMC component comprising at least 90% silicon carbide by volume.

11. The method of claim 1, wherein the layer of silicon carbide comprises less than 10% unreacted silicon by volume.

12. The method of claim 1, wherein the CMC component is at least a portion of a component for a gas turbine engine.

13. The method of claim 1, wherein the applying the resin coating further comprises injecting the resin coating into the tooling after the preform is added to the tooling.

14. A method for forming a silicon carbide-rich outer layer on a CMC component, the method comprising:
applying a resin coating comprising a carbonaceous resin and a particulate to a surface of a preform;
controlling a viscosity of the carbonaceous resin, such that the resin coating does not infiltrate the preform;
adding the preform to a tooling after applying the resin coating to the preform, wherein in the tooling is in a shape of at least a portion of a component of a gas turbine engine;
curing the preform;
removing the tooling;
pyrolyzing the resin coating on the surface of the preform to yield a resin carbon-char layer on the surface of the preform; and
after the pyrolyzing, immersing the preform into a molten material, the molten material being infiltrated into the preform.

15. The method of claim 14, wherein the molten material includes silicon.

16. The method of claim 15, wherein the molten material reacts with carbon in the resin carbon-char layer to form an outer layer including silicon carbide.

17. The method of claim 16, wherein the outer layer includes less than 10% silicon by volume.

18. A CMC component for a gas turbine engine, the CMC component produced by the method of claim 1 comprising:
a CMC body comprising a matrix reinforced with silicon carbide fibers, the matrix comprising silicon carbide; and
an outer layer surrounding the CMC body and defining a periphery of the CMC component, wherein the outer layer, wherein the outer layer includes at least 90% silicon carbide and/or silicon boride by volume,
wherein the CMC component is a blade, a vane, or a casing.

19. The CMC component of claim 18, wherein the outer layer has less than 2% residual porosity.

20. The CMC component of claim 18, wherein the outer layer has a thickness between 50 microns and 250 microns.

* * * * *